(12) United States Patent
Eleftheriadis et al.

(10) Patent No.: US 8,320,450 B2
(45) Date of Patent: Nov. 27, 2012

(54) SYSTEM AND METHOD FOR TRANSCODING BETWEEN SCALABLE AND NON-SCALABLE VIDEO CODECS

(75) Inventors: Alexandros Eleftheriadis, New York, NY (US); Danny Hong, New York, NY (US); Ofer Shapiro, Fair Lawn, NJ (US); Thomas Wiegand, Berlin (DE)

(73) Assignee: Vidyo, Inc., Hackensack, NJ (US)

( * ) Notice: Subject to any disclaimer, the term of this patent is extended or adjusted under 35 U.S.C. 154(b) by 1551 days.

(21) Appl. No.: 11/693,694

(22) Filed: Mar. 29, 2007

(65) Prior Publication Data
US 2007/0230568 A1 Oct. 4, 2007

Related U.S. Application Data

(60) Provisional application No. 60/786,997, filed on Mar. 29, 2006.

(51) Int. Cl.
*H04N 7/12* (2006.01)
(52) U.S. Cl. .................................. 375/240.12
(58) Field of Classification Search .................. None
See application file for complete search history.

(56) References Cited

U.S. PATENT DOCUMENTS

| | | | | |
|---|---|---|---|---|
| 6,226,328 B1 * | 5/2001 | Assuncao | ............... | 375/240.26 |
| 6,647,061 B1 * | 11/2003 | Panusopone et al. | .... | 375/240.12 |
| 2003/0202579 A1 | 10/2003 | Lin et al. | | |
| 2004/0139212 A1 * | 7/2004 | Mukherjee et al. | ........... | 709/230 |
| 2005/0058197 A1 * | 3/2005 | Lu et al. | .................. | 375/240.03 |
| 2005/0147163 A1 * | 7/2005 | Li et al. | ..................... | 375/240.12 |
| 2005/0265445 A1 * | 12/2005 | Xin et al. | ................... | 375/240.2 |
| 2006/0013300 A1 * | 1/2006 | Han | ......................... | 375/240.03 |
| 2006/0230162 A1 * | 10/2006 | Chen et al. | .................... | 709/229 |

FOREIGN PATENT DOCUMENTS

| | | |
|---|---|---|
| WO | WO2007/103889 | 3/2007 |
| WO | WO/2007/067990 | 6/2007 |
| WO | WO2007/076486 | 7/2007 |
| WO | WO2008/060262 | 5/2008 |
| WO | WO2008/082375 | 7/2008 |

OTHER PUBLICATIONS

Wiegand, et al., 2005, "Joint Draft 5: Scalable Video Coding," Joint Video Team, Doc. JVT-R201, Bangkok, Thailand.
Julien Reichel (Visiowave) et al., "Joint Scalable Video Model JSVM1", ITU Study Group 16—Video Coding Experts Group—ISO/IEC MPEG 7 ITU-T VCEG (ISO/IEC JTC1/SC29/WG11 and ITU-T SG 16 Q6), XX,XX, No. JVT-N021d1, Jan. 21, 2005, XP03000594.
Ahmad et al., "Video Transcoding: An overview of Various Techniques and Research Issues", IEEE Transactions on Multimedia, IEEE Service Center, Piscataway, NJ, US LNKD-DOI: 10.1109/TMM.2005.854472, vol. 7, No. 5, Oct. 1, 2005, pp. 793-804, XP011139259, ISSN: 1520-9210.

(Continued)

*Primary Examiner* — David Pearson
(74) *Attorney, Agent, or Firm* — Baker Botts L.L.P.

(57) ABSTRACT

Systems and methods are provided for performing transcoding in video communication system that use scalable video coding. The systems and methods can be used to transcode or convert input signals having certain characteristics into desired output signals having different characteristics requirements. The systems and methods are based on compressed domain processing, partial decoding-reencoding, or full decoding-reencoding with side information, depending on the specific characteristics of the input and desired output signals.

61 Claims, 6 Drawing Sheets

EXEMPLARY CONSTRUCTION OF THE RESULTING SVC TRANSFORM COEFFICIENT AS AN ADDITION OF A BASE LAYER TRANSFORM COEFFICIENT AND AN ENHANCEMENT LAYER TRANSFORM COEFFICIENT

OTHER PUBLICATIONS

Truong Cong Thang et al., "CE report on SVC and adaptationQoS", ITU Study Group 16—Video Coding Experts Group—ISO.IEC MPEG & ITU-T VCEG (ISO/IEC JTC1/SC29/WG11 and ITU-T SG16 Q6), XX,XX, No. M12915, Jan. 11, 2006, XP030041584.

U.S. Appl. No. 13/222,472, filed Aug. 31, 2011.

JVT: Joint Scalable Video Model JSVM4: ITU Study Group 16—Video Coding Experts Group—ISO/IEC MPEG & ITU-T VCEG (ISO/IEC JTC1/SC29/WG11 and ITU-T SG16 Q6), XX,XX, No. JVT-Q202, Nov. 18, 2005, XP030006256.

Wesley De Neve et al., "Real-Time BSD-Driven Adaptation along the Temporal Axis of H.264/AVC Bitstreams", Jan. 1, 2006, Advances in Multimedia Information Processing—PCM 2006 Lectures Notes in Computer Science: LNCS, Springer, Berlin, DE, pp. 131-140, XP019047685, ISBN: 978-3-540-48766-1.

European Search Report for EP11164830.9, dated Sep. 6, 2011.

* cited by examiner

FIG. 1: TRANSCODING SYSTEM
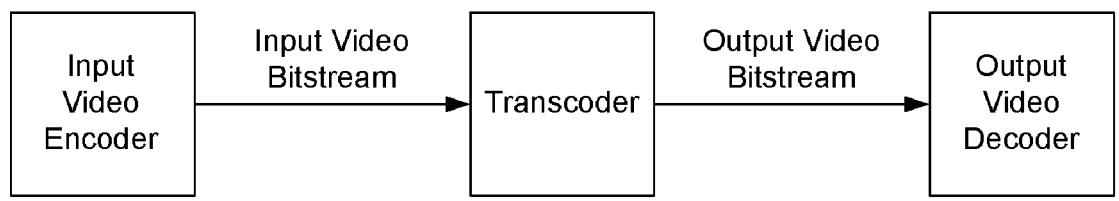

FIG. 2: EXEMPLARY SYSTEM FOR TRANSCODING VIA DECODING/RE-ENCODING
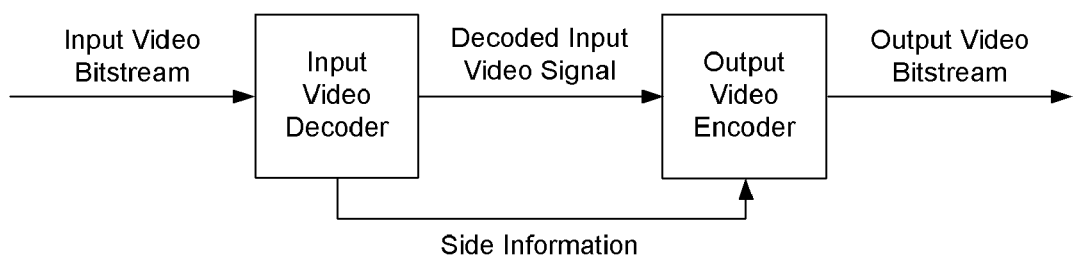

FIG. 3: EXEMPLARY SYSTEM FOR TRANSCODING VIA PARTIAL DECODING/RE-ENCODING
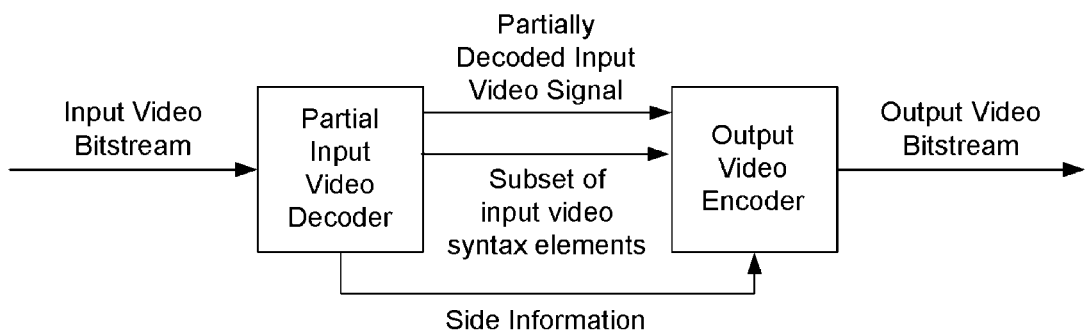

FIG. 4: EXEMPLARY SYSTEM FOR TRANSCODING IN THE COMPRESSED DOMAIN
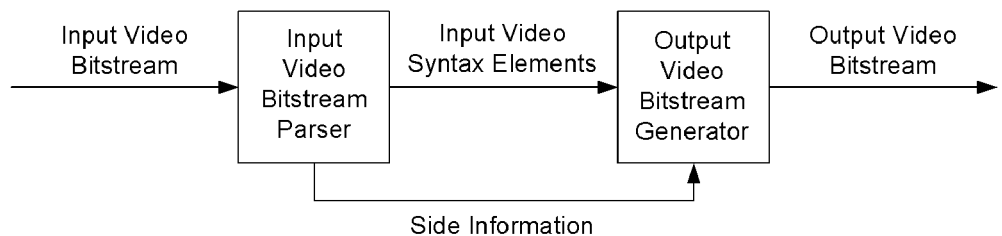

FIG. 5: EXEMPLARY CONSTRUCTION OF THE RESULTING SVC MOTION VECTOR AS AN ADDITION OF A BASE-LAYER MOTIOV VECTOR AND AN ENHANCEMENT LAYER MOTION VECTOR
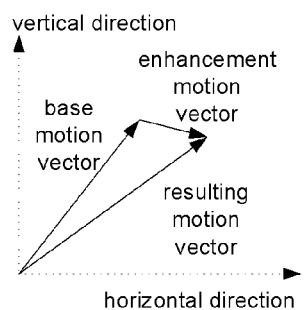

FIG. 6: EXEMPLARY CONSTRUCTION OF THE RESULTING SVC TRANSFORM COEFFICIENT AS AN ADDITION OF A BASE LAYER TRANSFORM COEFFICIENT AND AN ENHANCEMENT LAYER TRANSFORM COEFFICIENT
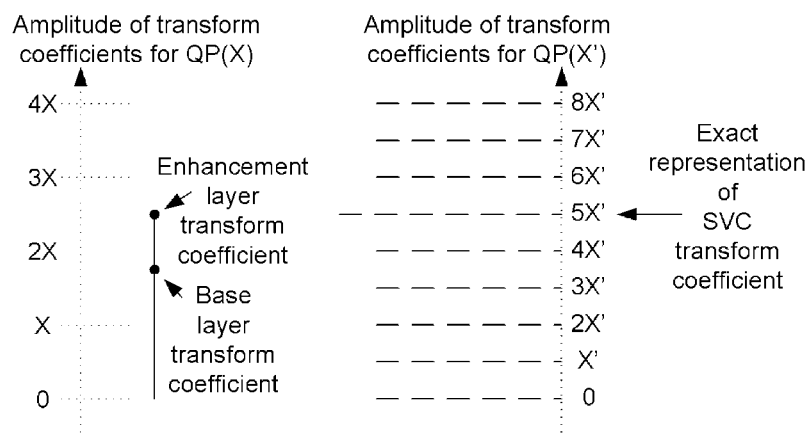

SYSTEM AND METHOD FOR TRANSCODING BETWEEN SCALABLE AND NON-SCALABLE VIDEO CODECS

CROSS-REFERENCE TO RELATED APPLICATIONS

This application claims the benefit of U.S. provisional patent application Ser. No. 60/786,997, filed Mar. 29, 2006. Further, this application is related to and claims the benefit of International patent application Nos. PCT/US06/28365, PCT/US06/028366, PCT/US06/028367, PCT/US06/028368, PCT/US06/061815, PCT/US06/62569, PCT/US07/62357, and PCT/US07/63335. All of the aforementioned priority and related applications, which are commonly assigned, are hereby incorporated by reference herein in their entireties.

FIELD OF THE INVENTION

The present invention relates to video data communication systems. The invention, in particular, relates to techniques for converting coded digital video from one scalable video coding format to another, or to and from scalable and other non-scalable video coding formats.

BACKGROUND OF THE INVENTION

Digital video communication systems may employ one, and sometimes more, digital video coding formats for the encoding, storage, and transport of video. For example, in traditional videoconferencing systems both H.261 and H.263 video coding standards are used, whereas in digital television systems MPEG-2/H.262 video coding is utilized. More recent systems use H.264 video both in videoconferencing and broadcast settings.

The need for using different coding formats in video communication systems is a direct result of the different operating assumptions that exist within different application domains. It is noted that even if the same coding format is used in two different application domains, as is the case with the use of H.264 in videoconferencing, mobile, and broadcast TV applications, the specific way that the format is used in the two different application domains may be very different. As a result, content created in one application domain may not be directly decodable by systems of the another domain. Signal modifications are required. Even in instances where exactly the same coding format is used, it is often the case that the bit rate of the coded video signal is higher than what can be used in a particular application context, and must therefore be reduced. Transcoding can also be employed when a rate distortion improvement in the overall system can be obtained.

In practical applications, the need for content interoperability creates several instances where it is desirable to efficiently convert between different video coding formats as well as between different parameter settings (such as bit rate) of the same format. These techniques are commonly collectively referred to as 'transcoding' techniques.

One example of the need for bitstream format conversion is support for legacy codecs in an application that uses a new codec. Transcoding can be employed for format conversion, e.g., when a participant connects to a video conference using a bitstream format that cannot be decoded by another participant.

Transcoding within a given coding format may be desirable to perform a change in spatial resolution, in order to accommodate the available display size, bit rate, processing power, or power consumption of a receiver, or general coding efficiency considerations. Similarly, it may also be desirable to change the temporal resolution to accommodate available bit rate, processing power, and power consumption of a receiver, or for general coding efficiency considerations. Another conversion typically desired is to change the bitstream size, or bit rate, to accommodate receiver capabilities in terms of bit rate, processing power, or power consumption.

Yet another example for the need for transcoding is for modifying bitstream characteristics, e.g., for error resilience or coding efficiency. Modifications of the bitstream may include, for example, change of coding decisions such as Intra macroblocks.

Transcoding may also involve a combination of one or more of the aforementioned changes.

Transcoding techniques for standard video codecs have been developed to cater to specific application scenarios, for example, between MPEG-2 and H.264 to allow conversion of broadcast TV video to a format suitable for IP-TV and mobile TV applications. These transcoding techniques are directed to video coded using existing single-layer coding techniques.

In addition to traditional, single-layer codecs, layered or scalable coding is available for video coding. Scalable coding is used to generate two or more "scaled" bitstreams collectively representing a given video signal in a bit rate efficient manner. Scalability can be provided in a number of different dimensions, namely temporally, spatially, and quality (also referred to as "Signal-to-Noise Ratio" (SNR) scalability or fidelity scalability). Depending on the codec's structure, any combination of spatial resolutions and frame rates may be obtainable from the codec bitstream. For example, a video signal may be scalably coded in different layers at CIF and QCIF resolutions, and at frame rates of 7.5, 15, and 30 frames per second (fps). The bits corresponding to the different layers can be transmitted as separate bitstreams (i.e., one stream per layer) or they can be multiplexed together in one or more bitstreams. For convenience in the description herein, the coded bits corresponding to a given layer may be referred to as that layer's bitstream, even if the various layers are multiplexed and transmitted in a single bitstream.

Codecs specifically designed to offer scalability features include, for example, MPEG-2 (ISO/IEC 13818-2, also known as ITU-T H.262) and the currently developed SVC (known as ITU-T H.264 Annex G or MPEG-4 Part 10 SVC). Scalable coding techniques specifically designed for video communication are described in commonly assigned international patent application No. PCT/US06/028365, "SYSTEM AND METHOD FOR SCALABLE AND LOW-DELAY VIDEOCONFERENCING USING SCALABLE VIDEO CODING". It is noted that even codecs that are not specifically designed to be scalable can exhibit scalability characteristics in the temporal dimension. For example, consider an MPEG-2 Main Profile codec, a non-scalable codec, which is used in DVDs and digital TV environments. Further, assume that the codec is operated at 30 fps and that a group of pictures (GOP) structure of IBBPBBPBBPBBPBB (period N=15 frames) is used. By sequential elimination of the B pictures, followed by elimination of the P pictures, it is possible to derive a total of three temporal resolutions: 30 fps (all picture types included), 10 fps (I and P only), and 2 fps (I only). The sequential elimination process results in a decodable bitstream because the MPEG-2 Main Profile codec is designed so that coding of the P pictures does not rely on the B pictures, and similarly coding of the I pictures does not rely on other P or B pictures. In the following, single-layer codecs with temporal scalability features are considered to be a special case of scalable video coding, and are thus included in the term scalable video coding, unless explicitly indicated otherwise.

Scalable codecs typically have a pyramidal bitstream structure in which one of the constituent bitstreams (called the "base layer") is essential in recovering the original medium at some basic quality. Use of one or more of the remaining bitstream(s) (called "the enhancement layer(s)") along with the base layer increases the quality of the recovered medium.

Scalable video coding is a particularly effective coding technique for interactive video communication applications such as multipoint videoconferencing. Commonly assigned International Patent Applications No. PCT/US06/28366 and No. PCT/US06/62569 describe a "Scalable Video Communication Server" (SVCS) and "Compositing Scalable Video Communication Server" (CSVCS) architecture, respectively, that serve the same purpose as that of a traditional Multipoint Control Unit (MCU), but with significantly reduced complexity and improved functionality. Similarly, commonly assigned International Patent Applications No. PCT/US06/061815 and PCT/US07/63335 describe mechanisms for improving error resilience, random access, and rate control in such systems.

Transcoding in scalable video shares several of the characteristics of single-layer transcoding, but has additional characteristics that are unique to scalable video applications or needs. Scenarios where transcoding between scalable video coding formats in a videoconferencing setting is needed may include:

A participant in a multi-party videoconference requests a video signal characteristic that cannot be efficiently represented in the particular scalable video coding format used together with the video signal characteristics of the bitstreams that the other conference participants request. An example is the use of the CSVCS in conjunction with a request for a video resolution that is slightly different then other requested video resolutions. Transcoding is needed to provide the slightly different video resolution.

A participant has a transmission channel that is much more error prone than the transmission channels of other participants. The transcoding is needed to insert more slices and intra macroblocks to compensate for the increased error.

Transcoding to a related single-layer format to support a legacy endpoint (e.g., H.264 SVC to AVC).

Transcoding to an unrelated single-layer format to support a legacy endpoint (e.g., H.264 SVC to any of H.263, MPEG2, H.261, MPEG-4, or any other video bitstream format except H.264 and SVC).

With reference to the latter two scenarios mentioned above, it is noted that distinction between related and unrelated single-layer coding formats compared to the scalable video coding format is significant. For example, SVC is an extension of H.264 AVC and therefore shares many common elements such as high-level syntax, motion compensation, transform coding, and deblocking filter. Consequently, conversion from and to these two formats is easier to perform in a computationally efficient way.

Consideration is now being given to transcoding in video communications systems that use scalable video coding. Attention is directed to techniques for transcoding between scalable and non-scalable bitstreams, in both directions. The desired transcoding techniques will have minimal impact on the quality of the video signal and have high computational efficiency.

SUMMARY OF THE INVENTION

Systems and methods are provided for performing transcoding in video communication system that use scalable video coding. The systems and methods can be used to transcode or convert input signals having certain characteristics into desired output signals having different characteristics requirements.

Six different exemplary categories of transcoding conversion are described herein. In three of the exemplary categories, the desired output has a specific temporal, quality, or spatial resolution requirement. In the other three exemplary categories, the desired output has a combination of quality and temporal, spatial and temporal, or combined spatial, quality, and temporal resolutions requirements. Within each category, specific systems and methods for conversion from H.264 SVC to AVC, AVC to SVC, and SVC to SVC are provided. The systems and methods are based on compressed domain processing, partial decoding-reencoding, or full decoding-reencoding with side information, depending on the specific characteristics of the input and desired output signals.

BRIEF DESCRIPTION OF THE DRAWINGS

Further features, the nature, and various advantages of the invention will be more apparent from the following detailed description of the preferred embodiments and the accompanying drawings in which:

FIG. 1 is a block diagram illustrating the overall architecture of a transcoding system in accordance with the principles of the present invention;

FIG. 2 is a block diagram illustrating an exemplary transcoding system using full decoding and re-encoding in accordance with the principles of the present invention;

FIG. 3 is a block diagram illustrating an exemplary transcoding system using partial decoding and re-encoding in accordance with the principles of the present invention;

FIG. 4 is a diagram illustrating an exemplary transcoding system using compressed-domain operations in accordance with the principles of the present invention;

FIG. 5 is a diagram illustrating an exemplary process of constructing a converted SVC motion vector as an addition of a base layer motion vector and an enhancement layer motion vector in accordance with the principles of the present invention;

FIG. 6 is a diagram illustrating an exemplary process of constructing a converted SVC transform coefficient as an addition of a base layer transform coefficient and an enhancement layer transform coefficient in accordance with the principles of the present invention;

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

FIG. 1 shows an exemplary transcoding system 100 including a transcoder 110, which can be used in video communication systems. An input video encoder 120 produces an input video bitstream having a set of certain characteristics (e.g., format and/or parametric characteristics). Transcoder 100 converts or modifies the characteristics of the input video bitstream to generate an output video stream having a different set of desired or target characteristics. The different set of characteristics may correspond to signal characteristics desired or required by an output video decoder 130. The output video stream is provided to an output video decoder 130

In FIG. 1, encoder 120 and decoder 130 are shown as connected to transcoder 100, as would be the case, for example, in a live video communication system. It is noted, however, the operations of transcoder 110 do not depend on the precise time when the signal encoding and decoding operations take place. Similarly, the mechanism through which the input video bitstream is made available to transcoder 100, or the mechanism through which the output video bitstream is made available to decoder 130, do not affect and are not relevant to the operation of transcoder 100. Indeed, for example, either of the input or output video bitstreams could be stored in a hard disk, RAM, or other storage means. Encoder 120 could also be replaced by a server that transmits pre-coded video through a network connection. Similarly, decoder 130 could be replaced by a server that stores the output video bitstream for later decoding or other use. Other mechanisms for making an input video bitstream available to transcoder 110, or using the output video bitstream of the transcoder 110, are possible. The transcoding techniques described herein can be applied in all such cases independent of the source, delivery mechanism, or use of the input and output bitstreams.

The transcoding operations of transcoder 110 may be lossless or lossy in response to given rate-constrains on the input and output signals. Lossless transcoding means that the input and the output signals are identical while both fulfill the given rate-constraints. Lossy transcoding means that the input and the output signals are not identical while both fulfill the given rate-constraints.

The H.264 SVC standard (see, e.g., T. Wiegand, G. Sullivan, J. Reichel, H. Schwarz, M. Wien, eds., "Joint Draft 5: Scalable Video Coding," Joint Video Team, Doc. JVT-R201, Bangkok, Thailand, January 2005, incorporated herein by reference in its entirety) provides temporal, SNR, and spatial scalability in coded video bitstreams. For transcoding from input SVC bitstreams, the following exemplary cases are considered for the output video format:

Transcoding to SVC bitstreams
Transcoding to H.264 bitstreams
Transcoding to H.263, MPEG2, H.261, MPEG4, or any other video bitstream formats (except H.264 and SVC).

For transcoding to output SVC bitstreams, the following exemplary cases are considered for the input video format:

Transcoding from SVC bitstreams
Transcoding from H.264 bitstreams
Transcoding from H.263, MPEG2, H.261, MPEG4, or any other video bitstream formats (except H.264 and SVC)

An important consideration for design and operation of transcoder 110 is whether the encoder (e.g., encoder 120) can anticipate and prepare the input video bitstream taking into account the subsequent transcoding process. For the description herein, it is typically assumed that the input video bitstream is so prepared in the case of SVC encoding, but generally not so prepared in the case of H.264 encoding. For H.263, MPEG2, H.261, MPEG4, or any other video encoding formats (except H.264 and SVC) it is assumed this the input video bitstream are not so prepared. It is noted that due to the significant difference between these standards, anticipation of the transcoding process by the encoder is not expected to result in a simplified transcoding process.

A transcoding method or technique ("Full Decode/Re-encode Transcoding (FDRT) 200"), which may be employed by transcoder 110 is shown in FIG. 2. FDRT technique 200 involves complete decoding and complete re-encoding of the pictures in the bitstreams (i.e., producing decoded pictures from the input bitstream at input video decoder 210), and encoding them at output video encoder 220 to produce the output bitstream). This technique is complex and causes the most delay compared to other transcoding techniques described herein (FIGS. 3-7, etc.). Because of this delay characteristic, it may be preferable to avoid the FDRT technique 200 for most applications. It may, however, be necessary to use the FDRT technique 200 when the input video signal can only be represented by the output video bitstream with large differences within the given bit-rate constraints. This may be the case when large portions of the decoding processes of the two involved codecs (input and output bitstreams) are different, or when the input and output bitstream characteristics (e.g., spatial resolution, SNR resolution, coding decisions) are substantially different. In such case, a full or complete decoding/re-encoding process may be necessary or desirable because of the significant drift between the input video encoder and the output video decoder that can be introduced by transcoding operations. This drift dramatically affects video quality and must be controlled for the video signals to be useful. Full control of the drift (i.e., the ability to adjust all output bitstream coding parameters involved) is only available with the full decode/re-encode transcoding technique.

As shown in FIG. 2, transcoding system 100 may in FDRT 200 advantageously use side information between decoder 210 and encoder 220 to enhance the output video encoding. This side information may include macroblock mode decisions, quantizer values, reference pictures, and/or motion vectors used in the input bitstream. For example, the use of motion vectors in the side information can advantageously eliminate or reduce the complexity associated with video encoding not only in FDRT 200 in FDRT 200, but also in all other transcoding processes described herein in which motion vectors information is used to supplement the signal conversion processes.

An inventive transcoding method or technique ("Partial Decode/Re-encode Transcoding (PDRT) 300") is shown in FIG. 3. PDRT technique 300 involves partial decoding of the pictures in the input bitstream at input video decoder 310 and re-encoding at output video decoder 320 using side information obtained from the input bitstream. In the PDRT technique 300, the input bitstream is parsed and modified, and only parts of the decoding process of the input codec and the encoding process of output codec are invoked, but not the complete chain. PDRT technique 300 is potentially less complex and potentially causes less delays than FDRT technique 200. The degree of improvement may be dependent on the similarity of the involved codecs' decoding processes and the amount of change between the input and output video signal characteristics. PDRT technique 300 may be advantageously employed in instances where the input video signal is approximated represented by the output video bitstream. In this case, the drift introduced by transcoding may be sufficiently small so that it can be controlled by adjusting only parts of the coding decisions in the output video bitstream, by the input video encoder anticipating the transcoding operations, or both.

As shown in FIG. 3, transcoding system 100 may in PDRT 300 advantageously use side information between decoder 310 and encoder 320 to enhance the output video encoding. This side information may include macroblock mode decisions, quantizer values, reference pictures, and motion vectors used in the input bitstream.

Another inventive transcoding technique ("Compressed Domain Transcoding (CDT) 400") is shown in FIG. 4. CDT technique 300 involves parsing at the Input Video Bitstream Parser 410 coded data (Input Video Syntax Elements) of the input video bitstream, and mapping them to coded data of the output video bitstream at the Output Video Bitstream generator 420. The input bitstream is parsed and modified, but the decoding processes of neither Input Codec nor Output Codec are invoked. CDT technique 400 is less complex and typically causes less delay than both FDRT technique 200 and PDRT technique 300. CDT technique 400 may be advantageously employed in instances where the input video signal is exactly represented by the output video bitstream. In such case, there may be no drift or only a very small drift is introduced by transcoding, which can be controlled by the input video encoder by anticipating the transcoding operations.

As shown in FIG. 4, may in CDT 300 advantageously use side information between parser 410 and generator 420 to enhance the mapping of input video syntax elements. The side information may include all or parts of all syntax elements of the input bitstream.

Generally, the modification or change of an input video bitstream that consists of dropping entire packets is not considered a transcoding technique. For example, eliminating at a media gateway packets of an SVC bitstream that correspond to a temporal layer not desired by a receiver is not considered to be transcoding operation, but a direct use of the scalability features of the bitstream. An exception is the case when the base layer of an SVC stream is extracted and converted to an AVC compatible stream. The base layer packets can be encapsulated into AVC-compatible NAL units, or SVC-compatible NAL units, with no change in the encoded data. The SVC encapsulation cannot be decoded by an AVC-only receiver and hence must be converted. In such case, a suitable high-level transcoding technique "Transport-Layer Transcoding" (TLT) may be used by transcoder 100.

Transcoding an SVC bitstream to H.263, MPEG2, H.261, MPEG4, or any other video bitstream formats (except H.264 and SVC) typically requires the transcoding to takes place using the FDRT technique. Similarly, transcoding an H.263, MPEG2, H.261, MPEG4, or any other video bitstream formats (except H.264 and SVC) to SVC typically requires the transcoding to take place using FDRT technique.

In the following, techniques for the transcoding of SVC to H.264, transcoding of H.264 to SVC, and transcoding of SVC to SVC are described. The transcoding operations are guided by requirements for certain characteristics in the output bitstream. The following transcoding types are considered, where the notation in parentheses is used to identify each type:

Given requested temporal resolution (T)
Given requested quality resolution (Q)
Given spatial resolution (S)
Given combination of quality and temporal resolution (Q/T)
Given combination of spatial and temporal resolution (S/T)
Given combination of spatial, quality, and temporal resolution (Q/S/T)

For each of these types, the format conversion types from H.264 to SVC (denoted as type "+"), from SVC to H.264 (denoted as type "−"), and from SVC to SVC (denoted as type "="), are described herein. The conversion type notation (+, −, or =) and the transcoding type notation (T, Q, S, Q/T, S/T, and Q/S/T) may be combined to uniquely identify the various conversion case and transcoding type combinations described herein. For example, the notation 'Q/T+' refers to transcoding from H.264 to SVC with a given requested combined quality and temporal resolution.

First, consider the cases of transcoding to an output bitstream with a particularly requested temporal resolution of the output video signal (transcoding type T). When transcoding to SVC, transcoding to a particular structure of dependencies for inter prediction (for temporal scalability) is requested. Spatial and SNR resolutions are assumed to be identical between input and output bitstream. H.264 and SVC provide the same basic capabilities for representing temporal resolutions of the video signal and structure of dependencies for inter prediction. As a result, the transcoding process options for conversion types +, −, and =, for transcoding type T are relatively straightforward and well-known in the art.

For transcoding from SVC to H.264 (case 'T−'), with the exception of additional signaling of the scalable content structure, temporal scalability is backwards-compatible with H.264. Moreover, when the SVC encoder anticipates the requested output video resolution, e.g., through temporal scalability, the transcoding process can use either CDT 400 or TLT. Temporal scalability is achieved through dependency structures of inter prediction references. For transcoding, a picture that is not needed for the decoding of other pictures can be dropped. The transcoding options for case 'T−', are well-known in the art.

For transcoding from H.264 to SVC (case 'T+'), if the H.264 encoder cannot take the transcoding into account, in general, FDRT 200 or PDRT 300 techniques must be used. Such is the case when the temporal prediction structure of the H.264 encoder input does not match the desired temporal prediction structure (through which temporal scalability is accomplished) in the output. The PDRT 300 technique may be used when some of the temporal layers of the input video signal match those of the output signal, but the structure of the higher temporal layers in the two signals are different. In this case the matching lower layers can be used without modification, but decoding and re-encoding of higher layer pictures will have to be performed. If the temporal prediction structure of the H.264 encoder input is a subset of the desired output temporal resolutions, then the transcoder can insert pre-coded picture data (e.g., skip picture or skip macroblock data) to create additional temporal scalability layers as desired, and eliminate temporal layers of the input video signal that are not desired at the output video signal. This is a form of CDT 400 where additional data are generated at the transcoder. If the H.264 encoder can anticipate and take the subsequent transcoding operations into account, so that the input temporal resolutions completely match the desired temporal resolutions at the output, then the CDT 400 technique where no additional data is generated can be employed.

For transcoding from SVC to SVC (case 'T='), when the SVC encoder anticipates the requested output video resolution, transcoding can be done using CDT 400 technique as described in case 'T+'. If the encoder does not anticipate the requested output resolution, then FDRT has to be used as in case 'T+'

Now, consider the cases of transcoding to an output bitstream with a particularly requested SNR resolution of the output video signal (transcoding type 'Q'). The requested SNR resolution of the output video signal may be assumed to be lower or equal to the input video SNR resolution. When transcoding to SVC, transcoding to a set of lower SNR resolutions (for SNR scalability) also may be requested. Temporal and spatial resolutions may be assumed to be identical between the input and output bitstreams.

It is noted that representations of SNR resolutions in SVC may be achieved through either of two mechanisms, coarse-grain scalability (CGS) or fine-grain scalability (FGS). In both mechanisms, an additional "enhancement" signal is transmitted to enhance the video quality of a base signal. This enhancement process can be repeated so that the first enhancement signal becomes the base signal and a second additional enhancement signal is transmitted to enhance the first enhancement/base signal. The repeated enhancements can be either motion vector refinements or residual signal refinements (for either inter or intra macroblocks) or both. It is noted that the macroblock type may also be predicted from the lower layer macroblock.

Motion vector refinements consist of transmitted additional motion vectors that are added to previously transmitted base motion vectors resulting in total or combined motion vectors that can be represented exactly using H.264 syntax. For example, as shown in FIG. 5, the addition of a base layer motion vector 52 to an enhancement layer motion vector 54 results in a combined total motion vector 56, which can be represented exactly using H.264 syntax.

Residual signal refinements consist of transmitted additional transform coefficients that are added to previously transmitted base transform coefficients resulting in transform coefficients that can be represented approximately using H.264 syntax. For example, as shown in FIG. 6, the addition of quantized base and enhancement layer transform coefficients 62 and 64, respectively, results in an SVC transform coefficient amplitude. The particular QP(X) amplitude value may or may not be exactly represented in H.264. The combined SVC transform coefficient value may be represented exactly only for a particular choice of QP. FIG. 6 shows, for example, an exact representation QP(X') when the quantized value is 5 as indicated on the scale on the right in the figure. For another choice of QP (QP(X)), as shown in the left side of the picture, the combined SVC transform coefficient value falls in between quantized values 2 and 3. Residual signals and motion vectors for inter macroblocks are associated with each other, i.e., particular motion vectors must be combined with particular residual signals.

For transcoding from SVC to H.264 with a given desired output SNR resolution (case 'Q−'), transcoding must generally use PDRT 300 technique. The transcoding may use CDT 400 technique, however, when the combined SVC transform coefficient levels add up to a value that can be represented by H.264 transform coefficient levels within the bit rate constraint. This condition, which can be enforced by the SVC encoder, allows for much simpler operation of the transcoder.

The SVC motion vectors that correspond to the requested SNR resolution are constructed (by adding base and enhancement layer motion vectors) and re-encoded by the output bitstream encoder. The SVC motion vectors construction and re encoding can be advantageously performed using CDT technique 400 with no error introduced.

The SVC residual transform coefficients, i.e., the SVC transform coefficients that correspond to the requested SNR resolution are constructed (by adding base and enhancement layer transform coefficients) and re-encoded by the output bitstream encoder. Further, it is useful to distinguish between CGS and FGS if control over the SVC encoder is available. Only in the case where CGS is used and control over the SVC encoder is available, the choice of the quantized transform coefficients can be made so that they have a corresponding counterpart in H.264 syntax. This correspondence typically is the case when the differences in quantizer value in H.264 and SVC are 6 or integer multiples of 6. Therefore, for this difference in the quantizer values, CDT 400 technique can be used for transcoding. Transcoding drift, in one approach, may be avoided by appropriately choosing the quantization parameter of H.264 to exactly represent the transform coefficient level in SVC at the cost of increased bit rate for the H.264 bitstream. In another approach to avoid drift, the transform coefficient reconstruction rule in SVC may be modified to enable a bit rate-efficient representation in H.264 at the cost of increased bit rate in SVC. In both approaches, no drift is produced and transcoding can be performed using CDT 400. If neither of the two approaches is used, a difference between the SVC coefficient and the H.264 coefficient is typically given and the introduced drift needs to be tracked. This can be done using PDRT 300 technique. The cases considered above are illustrated further below.

If the output bitstream encoder can exactly represent the SVC transform coefficient (e.g., using QP(X') as shown in FIG. 6), no drift between input video encoder and output video decoder occurs. The exact representation can be achieved by either choosing the quantization parameters so that the difference between enhancement and base layer QPs is an integer multiple of 6, or by selecting another set of SVC and H.264 quantization parameters for which the exact representation condition is fulfilled, or by modifying the SVC reconstruction rule (i.e. the rule that determines how from the base and enhancement layer transform coefficients the final transform coefficient is determined). The modification of the rule has to be such that the resulting SVC transform coefficient is represented without error using the inverse scaling method of H.264 within the given bit rate constraint.

Otherwise, if the output bitstream encoder cannot exactly represent the SVC transform coefficient (e.g., using QP(X) as shown in FIG. 6), undesirable drift occurs. However, the drift may be controlled by the input video encoder by anticipating transcoding operations and possible deviations introduced by the transcoding operations or by appropriate reference picture selection or intra coding. Control of drift by the input video encoder may be preferred for PDRT 300 and CDT 400 technique applications Anticipation of transcoding operations can lead the input video encoder to choose transform coefficients that can be exactly represented using H.264 transform coefficient syntax. Alternatively, the anticipation of transcoding operations can lead the input video encoder to choose transform coefficients that can be represented with a small error using H.264 transform coefficient syntax. For this purpose, an SVC encoder knows which levels can be represented with the allowed values of quantizer parameters. It is noted that the set of allowed values is given by the transcoding bit-rate constraint. A small value for the quantizer parameter allows for a more accurate representation of SVC transform coefficients but increases the bit rate for the H.264 output bit stream. Often, an SVC encoder has a choice which quantizer values to use and which refinement to use. Such an SVC encoder can advantageously make the choice to have only small deviations.

Commonly assigned International Patent Application No. PCT/US06/028365 "System and Method for Scalable and Low-Delay Videoconferencing Using Scalable Video Coding" introduces threading in temporal prediction structures as means of implementing temporal scalability. Further, commonly assigned International Patent Application No. PCT/US06/061815 "Systems and Method for Error Resilience and Random Access in Video Communication Systems," describes techniques for improved error resilience and random access in video communication systems that use scalable video coding in general, and threaded prediction structures in particular. The latter application specifically describes 'LR' pictures, which are pictures that correspond to the lowest temporal layer of a scalable coded video signal, and which are reliably transmitted to a receiver using appropriate transport-layer techniques such as retransmissions.

Anticipating potential transcoding, an encoder in the described or similar video communication systems, may choose to restrict the SVC bit stream for LR pictures differently than pictures of higher temporal levels (L1, L2, ..., LN pictures). For LR pictures, the transcoding method preferably is chosen so that no drift occurs allowing for compressed domain transcoding operations (CDT 400). This choice may lead to some restrictions and bit rate overhead for the LR pictures. Alternatively, if the SVC bit stream is constructed so that drift occurs, then the drift must be determined and mitigated in PDRT 300 operations.

For pictures that are not LR pictures, the encoder can freely choose the construction of the bitstream and is typically not under obligation to enforce an SVC representation for the transform coefficient levels to be represented exactly or such that no drift occurs. The reason for this is that since these (non-LR) pictures are temporally nested, their spatio-temporal error propagation is very limited. In other words, the method for transcoding (FDRT, PDRT, CDT) can be chosen on a picture-by-picture basis. This choice can be also made dependent on whether a picture is an LR and not an LR picture, or whether the picture is an enhancement or not in spatial or SNR resolution.

When using PDRT 300 technique, the transcoder (e.g., transcoder 110) can also itself control the drift. For such control, the transcoder may monitor the accumulated drift error by using the motion vectors for the current picture, and motion-compensate from the difference between the transcoded (output video signal) reference picture and the input video reference picture. This motion-compensated difference signal is taken into account by the transcoder when approximating the SVC transform coefficients of the current picture by adding them to the SVC transform coefficients of the input video signal. This method of drift control is well-known in the art.

For transcoding from H.264 to SVC (case 'Q+'), transcoding must typically be conducted using PDRT 300 technique. In this case, it may be assumed that in addition to the largest output video quality, lower output video qualities also are requested. For transcoding, the H.264 motion vectors can be partitioned into various SVC motion vectors: base layer, enhancement layer and (possibly) left-over motion vectors for the SVC bitstream. The partitioning into components can be constructed either spatially, or such that the sum of all SVC motion vector components provides the H.264 motion vectors, or combinations thereof Left-over motion vectors are not transmitted as part of the SVC bitstream.

Alternatively, the H.264 transform coefficients can be partitioned into various SVC transform coefficients: base layer, enhancement layer and (possibly) left-over transform coefficients for the SVC bitstream. The partitioning into components can be constructed either in frequency, or such that the sum of all SVC transform coefficients components provides the H.264 transform coefficients, or combinations thereof Left-over coefficients are not transmitted as part of the SVC bitstream.

The particular partitioning for the two cases above may be part of decision making rate-distortion optimization algorithms which is described below.

The rate-distortion optimization algorithm may determine an efficient partitioning for all reconstruction points that have lower SNR than the input H.264 bitstream. Within a picture, the transcoding may possibly affect intra coding parts and possibly inter coding parts. For the intra coding parts, the residual transform coefficients may be partitioned into base layer and enhancement layer transform coefficients. Note that for a two-layer example with the enhancement layer being equal to the H.264 input bitstream, the base layer coefficients are preferably encoded by an increased quantizer value of 6 relative to the H.264 quantizer value. The coefficients are obtained by quantizing the H.264 input transform coefficients with a quantizer value increased by 6. Typically, choice of the quantizer values in SVC is decided by a process called "Rate-Distortion Optimization" (RDO). In this process the quantizer values are chosen by minimizing $D+\lambda^*R$. Here, for transcoding D corresponds to the drift between H.264 input and SVC output, R corresponds to the rate for the SVC output, and $\lambda$ is a Lagrange parameter (positive value) that provides the trade-off between D and R. Hence, the transcoder may be operated by a minimization of $D+\lambda^*R$, which proceeds over the various options for the output representation. In SVC, the intra transcoding creates drift as the intra prediction is done in the base layer only in SVC. An option to avoid this drift is to change the intra prediction in SVC to also use reference samples in the enhancement layers.

The approach in the rate-distortion optimization algorithm for inter coding is similar to the case of transcoding in intra coding in which the drift needs to be controlled. For inter coding, the minimization of $D+\lambda^*R$ also includes a set of motion vectors. The residual transform coefficients are partitioned into base layer and enhancement layer transform coefficients. It is noted that for a two-layer example with the enhancement layer being equal to the H.264 input bitstream, the base layer coefficients are typically coded by an increased quantizer value of 6 relative to the H.264 quantizer value. These are obtained by quantizing the H.264 input transform coefficient with a quantizer value increased by 6. The motion vectors are also partitioned into base layer and enhancement layer motion vectors. As before the choice of the quantizer values is decided by the RDO process, in which the quantizer values are chosen by minimizing $D+\lambda^*R$. Here, for transcoding D corresponds to the drift between H.264 input and SVC output, R corresponds to the rate for the SVC output, and $\lambda$ is a Lagrange parameter (positive value) that provides the trade-off between D and R. Hence, the transcoder may be operated by a minimization approach for $D+\lambda^*R$ which proceeds over the various options for the output representation.

In summary, to prepare for transcoding an SVC encoder needs to close the hybrid coding loop for the various SNR resolutions that are requested for the output that are not identical to the H.264 input resolution. The various SNR resolutions correspond to the partitioning of H.264 motion vectors and H.264 transform coefficients. Therefore, for a particular SNR resolution (which is not equal to the input resolution), a drift is produced between the motion-compensated SNR resolution and the current SNR resolution. The drift is due to the missing SVC transform coefficients, which need to be tracked and compensated for to avoid video distortions. Further, use of the deblocking filter in the SVC encoder may also be adjusted to minimize drift. In the present invention, the tracking is performed within each layer, and rate-distortion optimization is used to optimize performance.

For transcoding from SVC to SVC (case 'Q='), transcoding must be using the PDRT 300 technique It may be assumed that in addition to the largest output video quality, which is lower than the largest input video quality, lower output video qualities also are requested. When the lower output video qualities are identical to the lower input video qualities, transcoding of the highest video quality is similar to the rate shaping or optimization algorithms mentioned above for H.264 to SVC transcoding (case 'Q+'). A difference in case 'Q=' is that the transform coefficients or transform coefficient prediction errors of H.264 may also include coefficient refinements of the highest layer, and similarly motion vectors and motion vector prediction errors of H.264 may also include motion vector refinements of the highest layer. Similar differences are present in all other transcoding cases for SVC to SVC. It is noted that the transcoder may also discard a number of the higher layers of the input video signal prior to transcoding, if required to do so by the requirements of the output video signal (e.g., a lower than the highest temporal scalability layer is desired).

Consider now the case of transcoding to an output bitstream with a particularly requested spatial resolution of the output video signal (transcoding type 'S'). It may be assumed that when transcoding to SVC, transcoding to a set of lower spatial resolutions (for spatial scalability) also may be requested. Temporal and SNR resolutions may be assumed to be identical between input and output bitstream.

Representation of multiple spatial resolutions in SVC is achieved in similar manner as for SNR scalability (i.e., through prediction of macroblock types, motion vectors, intra content and inter coding residuals). The only difference in the representation of multiple spatial resolutions is that coded data of the lower layer has to be scaled or upsampled to the desired higher resolution in order to be used. Macroblock type and motion vector prediction is a lossless method designed to reduce bit rate and can be represented exactly using H.264 syntax. Motion vector refinements consist of transmitted additional motion vectors that are added to previously transmitted and scaled base motion vectors resulting in motion vectors that can be represented exactly using H.264 syntax. Intra content prediction up-samples the intra-coded signal from the base-layer; the base layer signal may be an H.264-conforming prediction of an intra macroblock or it maybe an SVC-conforming representation of an intra macroblock, as explained below.

It is noted that an H.264-conforming intra macroblock consists of a spatial predictor operated either based on 4×4, 8×8, or 16×16 luma pixel block size, followed by a coded residual signal, optionally followed by de-blocking of the intra macroblock. An SVC-conforming intra macroblock consists of an H.264 conforming intra macroblock followed by a residual signal that is added as an SNR enhancement to the predictor formed by an up-sampled H.264-conforming or SVC-conforming intra macroblock. The transform coefficients of an SVC-conforming macroblock that is coded using a prediction from either an H.264- or SVC-conforming intra macroblock can be represented approximately using H.264 syntax.

Inter coding residual prediction up-samples the inter coding residuals from a base layer followed by a residual signal that is added as an SNR enhancement to the predictor.

For transcoding from SVC to H.264 (case 'S−') transcoding must be typically conducted using PDRT 300 technique. For transcoding, the SVC spatial layer that is closest to the requested H.264 spatial resolution is extracted from the bitstream. If the spatial resolution of this SVC layer is identical to that of the requested H.264 spatial resolution (which can be assured by an SVC encoder that anticipates transcoding), transcoding may use PDRT 300 technique. Otherwise, if the spatial resolutions the two layers are not identical, transcoding may require full decode/re-encode operations.

For the case that transcoding uses partial decode/re-encode operations (e.g., using PDRT 300 technique), it is the macroblocks which cannot be represented using H.264 syntax that need to be transcoded. These macroblocks are mainly those with Intra_BL prediction and residual prediction. The resulting transform coefficients need to be approximated using H.264 syntax. Further, for this case, drift needs to be controlled by the transcoder. This may be done in a manner similar to that described above for transcoding from SVC to H.264 for a given output quality resolution (case 'Q−'). For controlling the drift, the difference between input and output may be minimized for a given rate constraint through a rate-distortion optimization algorithm applied on each layer. The algorithms may be similar to the one described above with the possible variables typically being quantization parameters (for inter and intra coding) and motion vectors (for inter-coding only).

For transcoding from H.264 to SVC (case 'S+'), transcoding must be conducted using FDRT 200 processes. Some motion vectors from H.264 can, however, may be re-used to enhance the transcoding process.

When transcoding from SVC to SVC (case 'S=') transcoding may be conducted using FDRT 200 or possibly using PDRT 300 processes. It may be assumed that in this case, the requested output video resolution may be smaller or larger than an available input video resolution (e.g. increasing picture size of one video signals in a CSVCS by 20%). The input spatial resolution that forms the basis for transcoding is chosen so that it is the closest lower spatial resolution to the requested output resolution. The transcoding process consists of creating predictors with the appropriate scaling factors from the lower resolution (e.g. 20%). The original signal to be encoded is either the upsampled lower resolution signal or a downsampled higher resolution signal (if available). SVC re-encoding may be accomplished by re-using the lower layer prediction information and residuals that are encoded to compensate the drift. Typically, motion estimation can be avoided.

Consider now the case of transcoding to an output bitstream with a particularly requested SNR and temporal resolution of the output video signal (transcoding type 'Q/T'). It may be assumed that in this case, when transcoding to SVC that transcoding to a set of lower SNR and temporal resolutions (for SNR and temporal scalability) may be requested. Spatial resolutions may be assumed to be identical between input and output bitstream.

For transcoding from SVC to H.264 (case 'Q/T−') it may be assumed that the SVC encoder anticipates the requested temporal output resolution. The methods and techniques for transcoding case 'Q−' can therefore be applied in case 'Q/T−'.

For transcoding from H.264 to SVC (case 'Q/T+') transcoding must be conducted using FDRT 200 operations, unless a hierarchical temporal prediction structure is used in the H.264 input bitstream. If the hierarchical temporal prediction structure is used, transcoding methods and techniques applicable to the Q+ transcoding case can be applied including PDRT 300 technique, or the picture-by-picture switched application of transcoding techniques. If no hierarchical temporal prediction structure is used, the transcoder may insert such a hierarchical temporal prediction structure since it enhances coding efficiency for SNR scalability.

For transcoding from SVC to SVC (case 'Q/T='), it may be assumed that the SVC encoder anticipates the requested temporal output resolution. The methods for case 'Q=' can therefore be applied in case 'Q/T='.

A mix of transcoding techniques the compressed domain embodiment (e.g., CDT 400 technique) and the full decode/re-encode embodiment/partial decode/re-encode embodiment (e.g., FRDT 200 and PRDT 300 techniques) may be practical and desirable when scalable temporal layers are used. For example, the temporal base layer from SVC may be copied and the temporal enhancement layers may be transcoded using the partial decode/re-encode embodiment/ compressed domain embodiment or be replaced by other pre-coded bitstreams such as skipped pictures.

Now, consider the case of transcoding to an output bitstream with a particularly requested spatial and temporal resolution of the output video signal (transcoding type 'S/T'). It may be assumed that for transcoding to SVC, a set of lower spatial and temporal resolutions (for spatial and temporal scalability) also may be requested. SNR resolutions may be assumed to be identical between input and output bitstream.

For transcoding from SVC to H.264 (case 'S/T−') it may be assumed that the SVC encoder anticipates the requested temporal output resolution. The transcoding methods applicable to case 'S−' can therefore be applied to case 'S/T−'.

For transcoding from H.264 to SVC (case 'S/T+'), the transcoding must be conducted using FDRT 200 operations.

For transcoding from SVC to SVC (case 'S/T=') it may be assumed that the SVC encoder anticipates the requested temporal output resolution. The transcoding methods applicable to case 'S=' can therefore be applied can therefore be applied to case 'S/T='.

Lastly, consider transcoding case 'S/Q/T'. Transcoding for this case may be addressed as a combined application of types 'Q/T' followed by 'S', or 'S/T' followed by 'Q', in accordance with the principles of the present invention. Transcoding for cases 'Q/T' 'S', 'S/T' and 'Q' has been described herein. Accordingly, for brevity, description of transcoding for case 'S/Q/T' is not repeated.

The transcoder for all described combinations may be operated so that it inserts syntax elements that increase or decrease error resiliency of the bitstream. Such syntax elements may include macroblock modes (Intra, Inter), intra prediction signals, motion vectors or residual transform coefficients. Moreover, the transcoder may add slices or remove slices to the bitstream.

The transcoder for all described combinations may adjust the bitstream to be transmitted over different networks. These networks include RTP/IP, ISDN, and H.324M circuit switched networks. The transcoder may adjust the syntax elements for error resiliency, modify the size of slices for adjustment to MTU size restrictions or transmission errors, or for other reasons.

The transcoder for all described combinations may adjust the bitstream to conform to different profiles of SVC and H.264.

When the output bitstream conforms to the SVC standard, the transcoder can also be combined with the CSVCS functionality (described in commonly assigned International Patent Application No. PCT/US06/62569). In this configuration, the transcoder may be operated by receiving multiple input bitstreams (being either H.261, H.263, H.264 or SVC encoded) and applying all described conversion techniques described herein (T+, Q+, S+, Q/T+, S/T+, S/Q/T+) prior to compositing them into a single SVC output bitstream using standard CSVCS techniques.

Although the preferred embodiments described herein use the H.264 SVC draft standard, as is obvious to persons skilled in the art the techniques can be directly applied to any coding structure that provides spatial, quality, or temporal scalability.

It also will be understood that in accordance with the present invention, the transcoding techniques described herein may be implemented using any suitable combination of hardware and software. The software (i.e., instructions) for implementing and operating the aforementioned transcoding techniques can be provided on computer-readable media, which can include without limitation, firmware, memory, storage devices, microcontrollers, microprocessors, integrated circuits, ASICS, on-line downloadable media, and other available media.

The invention claimed is:

1. A digital video signal processing system comprising:
a video processing unit ("transcoder") with at least one digital video signal input and at least one digital video signal output,
wherein the input video coding format of the transcoder is SVC and the output video coding format of the transcoder is H.264,
and wherein the transcoder is configured to decode and combine individual layer coding parameters of the at least digital video signal input that is coded separately in different layers, and encode the combined parameters into single values at the at least one output video signal, so that the at least one digital video signal output has a desired quality resolution that is less than or equal to the input quality resolution.

2. The system of claim 1, wherein the individual coding parameters include transform coefficient data.

3. The system of claim 1, wherein the individual coding parameters include motion vector data.

4. The system of claim 1 wherein to minimize transcoding drift at least one of periodic intra macroblocks and a threaded temporal prediction structure is used in encoding of the input video signal.

5. A digital video signal processing system comprising:
a video processing unit ("transcoder") with at least one digital video signal input and at least one digital video signal output;
at least one input video encoder; and
an electronic communication network that links the at least one input video encoder with the transcoder,
wherein the video coding format of the input video encoder is SVC, the input video coding format of the transcoder is SVC, and the output video coding format of the transcoder is H.264,
wherein the input video encoder is further configured so that SVC coded data can be represented exactly by H.264 for at least one picture contained in the SVC coded data,
and wherein the transcoder is further configured to decode and combine individual layer coding parameters of the at least one input signal that is coded separately in different layers, and encode the combined parameters into single values at the at least one output video signal so that the at least one output video signal has a desired quality resolution that is less than or equal to the input quality resolution.

6. The system of claim 5, wherein the individual coding parameters include transform coefficient data.

7. The system of claim 5, wherein the individual coding parameters include motion vector data.

8. The system of claim 5, wherein the input video encoder is further configured so that the QP difference in the transform coefficient data of a block in successive SVC layers is a multiple of 6.

9. The system of claim 5 wherein the input video encoder is further configured such that SVC coded data can be represented exactly by H.264 for a least the lowest temporal layer (LR) pictures.

10. A digital video signal processing system comprising:
a video processing unit ("transcoder") with at least one digital video signal input and at least one digital video signal output;

wherein the input video coding format of the transcoder is H.264 and the output video coding format of the transcoder is SVC;

and wherein the transcoder is configured to partition individual layer coding parameters of the at least one input signal into a number of component(s), and separately code all or only a fraction of the number of components across the different layers of the at least one output video signal so that the at least one output video signal has at least a desired quality resolution that is less than the input quality resolution.

11. The system of claim 10, wherein the individual coding parameters include transform coefficient data.

12. The system of claim 11, wherein the partitioned components of the transform coefficient data include at least one of:
coefficient data corresponding to different frequencies;
sets of values that when added together result in the original coefficient data value; and a combination thereof.

13. The system of claim 11, wherein the encoding of the transform coefficient data within the layers of the at least one output video signal is such that the QP difference in a block in successive layers is a multiple of 6.

14. The system of claim 10, wherein the individual coding parameters include motion vector data.

15. The system of claim 14, wherein the partitioned components of the motion vector data include at least one of:
motion vector data corresponding to different spatial locations;
sets of values that when added together result in the original motion vector data; and
any combination thereof.

16. The system of claim 10, wherein the transcoder is further configured to partition individual layer coding parameters of the at least one input signal using rate-distortion optimization within each layer with the distortion corresponding to the drift within the each layer.

17. The system of claim 10, wherein to eliminate transcoding drift the encoding format of the input video signal is further configured to perform intra prediction using reference samples in enhancement layers.

18. A digital video signal processing system comprising:
a video processing unit ("transcoder") with at least one digital video signal input and at least one digital video signal output,
wherein the input video coding format of the transcoder is SVC, wherein the output video coding format of the transcoder is SVC and contains the same spatial, temporal, and quality resolutions of the input video coding format except for the highest layer of the input video coding format, and
wherein the transcoder is configured to partition individual coding parameters of the highest layer of the at least one input signal into a number of component(s), and separately code all or only a fraction of the number of components across the different layers of the at least one output video signal so that the at least one output video signal has at least a desired quality resolution that is less than the quality resolution of the highest layer of the at least one input video signal.

19. The system of claim 18, wherein the individual coding parameters include at least one of transform coefficient data and refinements thereof.

20. The system of claim 19, where the partitioned transform coefficient data include at least one of:
transform coefficients or refinements thereof corresponding to different frequencies;
sets of values that when added together result in an original coefficient or refinement value; and
any combination thereof.

21. The system of claim 19, wherein the encoding of the transform coefficients or refinements thereof within the layers of the at least one output video signal is such that the QP difference in a block in successive layers is a multiple of 6.

22. The system of claim 18, wherein the individual coding parameters include motion vector data or refinements thereof.

23. The system of claim 22, where the partitioned motion vector components include at least one of:
motion vectors or refinements thereof corresponding to different spatial locations;
sets of values that when added together result in the original motion vector or motion vector refinement; and
a combination thereof.

24. The system of claim 18, wherein the transcoder further configured to partition individual layer coding parameters of the at least one input signal using rate-distortion optimization within each layer with the distortion corresponding to the drift within the each layer.

25. The system of claim 18, wherein to eliminate transcoding drift the encoding format of the input video signal is further configured to perform intra prediction using reference samples in enhancement layers.

26. A digital video signal processing system comprising:
a video processing unit ("transcoder") with at least one digital video signal input and at least one digital video signal output,
wherein the input video coding fauna of the transcoder is SVC, wherein the output video coding format of the transcoder is H.264 with a spatial resolution that is among the spatial resolutions provided by the input video coding format,
and wherein the transcoder is configured to:
decode and combine individual layer coding parameters of the at least one input signal that is coded separately in different layers, and encode the combined parameters into single values at the at least one output video signal when the equivalent syntax is available in the output video coding format, and encode an approximation to the combined parameters into the at least one output video signal when an exact encoding is not available in the output video coding format.

27. The system of claim 26, wherein the individual coding parameters include transform coefficient data.

28. The system of claim 26, wherein the individual coding parameters include motion vector data.

29. The system of claim 26, wherein the transcoder if further configured encode an approximation to the combined parameters of the at least one input video signal using rate-distortion optimization, wherein the distortion corresponds to the drift.

30. The system of claim 26 wherein to minimize transcoding drift one of periodic intra macroblocks and a threaded temporal prediction structure is used in encoding of the input video signal.

31. A method for transcoding at least one digital video signal input and at least one digital video signal output, wherein the input video coding format is SVC and the output video coding format is H.264, the method comprising:
decoding and combining individual layer coding parameters of the at least digital video signal input that is coded separately in different layers; and
encoding the combined parameters into single values in the at least one output video signal so that the at least one digital video signal output has a desired quality resolution that is less than or equal to the input quality resolution.

32. The method of claim 31, wherein the individual coding parameters include transform coefficient data.

33. The method of claim 31, wherein the individual coding parameters include motion vector data.

34. The method of claim 31 further comprising: using at least one of periodic intra macroblocks and a threaded temporal prediction structure in encoding of the input video signal to minimize transcoding drift.

35. A method for encoding at least one digital video signal input over an electronic communication network to a transcoder for transcoding to at least one digital video signal output at the transcoder, wherein the input video coding format is SVC and the output video coding format is H.264, the method comprising:
 encoding the at least one digital video signal input as SVC coded data that can be represented exactly by H.264 for at least one picture contained in the SVC coded data; and
 at the transcoder decoding and combining individual layer coding parameters of the at least one input signal that is coded separately in different layers, and encoding the combined parameters into single values in the at least one output video signal so that the at least one output video signal has a desired quality resolution that is less than or equal to the input quality resolution.

36. The method of claim 35, wherein the individual coding parameters include transform coefficient data.

37. The method of claim 35, wherein the individual coding parameters include motion vector data.

38. The method of claim 35, further comprising encoding so that the QP difference in the transform coefficient data of a block in successive SVC layers is a multiple of 6.

39. The method of claim 35, further comprising encoding so that SVC coded data can be represented exactly by H.264 for at least the lowest temporal layer (LR) pictures.

40. A method for transcoding at least one digital video signal input and at least one digital video signal output, wherein the input video coding format is SVC and the output video coding format is H.264, the method comprising:
 partitioning individual layer coding parameters of the at least one input signal into a number of component(s); and
 separately coding all or only a fraction of the number of components across the different layers of the at least one output video signal so that the at least one output video signal has at least a desired quality resolution that is less than the input quality resolution.

41. The method of claim 40, wherein the individual coding parameters include transform coefficient data.

42. The method of claim 41, wherein the partitioned components of the transform coefficient data include at least one of:
 coefficient data corresponding to different frequencies;
 sets of values that when added together result in the original coefficient data value; and a combination thereof.

43. The method of claim 41, wherein the encoding of the transform coefficient data within the layers of the at least one output video signal is such that the QP difference in a block in successive layers is a multiple of 6.

44. The method of claim 40, wherein the individual coding parameters include motion vector data.

45. The method of claim 44, wherein the partitioned components of the motion vector data include at least one of:
 motion vector data corresponding to different spatial locations;
 sets of values that when added together result in the original motion vector data; and
 a combination thereof.

46. The method of claim 40, wherein partitioning individual layer coding parameters of the at least one input signal comprises using rate-distortion optimization within each layer with the distortion corresponding to the drift within the each layer.

47. The method of claim 40, wherein to eliminate transcoding drift the encoding format of the input video signal is further configured to perform intra prediction using reference samples in enhancement layers.

48. A method for transcoding at least one digital video signal input and at least one digital video signal output, wherein the input video coding format is SVC, wherein the output video coding format is SVC and contains the same spatial, temporal, and quality resolutions of the input video coding format except for the highest layer of the input video coding format, the method comprising:
 partitioning individual layer coding parameters of the highest layer of the at least one input signal into a number of component(s); and
 separately coding all or only a fraction of the number of the components across the different layers of the at least one output video signal so that the at least one output video signal has at least a desired quality resolution that is less than the quality resolution of the highest layer of the at least one input video signal.

49. The method of claim 48, wherein the individual coding parameters include at least one of transform coefficient data and refinements thereof.

50. The method of claim 49, where the partitioned transform coefficient data include at least one of:
 transform coefficients or refinements thereof corresponding to different frequencies;
 sets of values that when added together result in an original coefficient or refinement value; and
 a combination thereof.

51. The method of claim 49, wherein the encoding of the transform coefficients or refinements thereof within the layers of the at least one output video signal is such that the QP difference in a block in successive layers is a multiple of 6.

52. The method of claim 48, wherein the individual coding parameters include motion vector data or refinements thereof.

53. The method of claim 52, where the partitioned motion vector components include at least one of:
 motion vectors or refinements thereof corresponding to different spatial locations;
 sets of values that when added together result in the original motion vector or motion vector refinement; and
 a combination thereof.

54. The method of claim 48, wherein partitioning individual layer coding parameters of the at least one input signal comprises using rate-distortion optimization within each layer with the distortion corresponding to the drift within the each layer.

55. The method of claim 48, wherein to eliminate transcoding drift the encoding format of the input video signal is configured to perform intra prediction using reference samples in enhancement layers.

56. A method for transcoding at least one digital video signal input and at least one digital video signal output, wherein the input video coding format is SVC, wherein the output video coding format is H.264 with a spatial resolution that is among the spatial resolutions provided by the input video coding format, the method comprising:

decoding and combining individual layer coding parameters of the at least one input signal that is coded separately in different layers; and encoding the combined parameters into single values at the at least one output video signal when the equivalent syntax is available in the output video coding format, and encoding an approximation to the combined parameters into the at least one output video signal when an exact encoding is not available in the output video coding format.

57. The method of claim 56, wherein the individual coding parameters include transform coefficient data.

58. The method of claim 56, wherein the individual coding parameters include motion vector data.

59. The method of claim 56, wherein encoding an approximation to the combined parameters of the at least one input video signal comprises using rate- distortion optimization, wherein the distortion corresponds to the drift.

60. The method of claim 56, further comprising to minimize transcoding drift using one of periodic intra macroblocks and a threaded temporal prediction structure in encoding of the input video signal.

61. A non-transitory computer readable medium comprising a set of executable instructions for performing the methods of one of claims 31-60.

* * * * *

UNITED STATES PATENT AND TRADEMARK OFFICE
CERTIFICATE OF CORRECTION

PATENT NO. : 8,320,450 B2  
APPLICATION NO. : 11/693694  
DATED : November 27, 2012  
INVENTOR(S) : Eleftheriadis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,553 days.

Signed and Sealed this  
Twenty-eighth Day of May, 2013

Teresa Stanek Rea  
*Acting Director of the United States Patent and Trademark Office*